March 10, 1942.   F. K. CHANDLER   2,275,887
FEED HANDLING APPARATUS
Filed Jan. 2, 1940
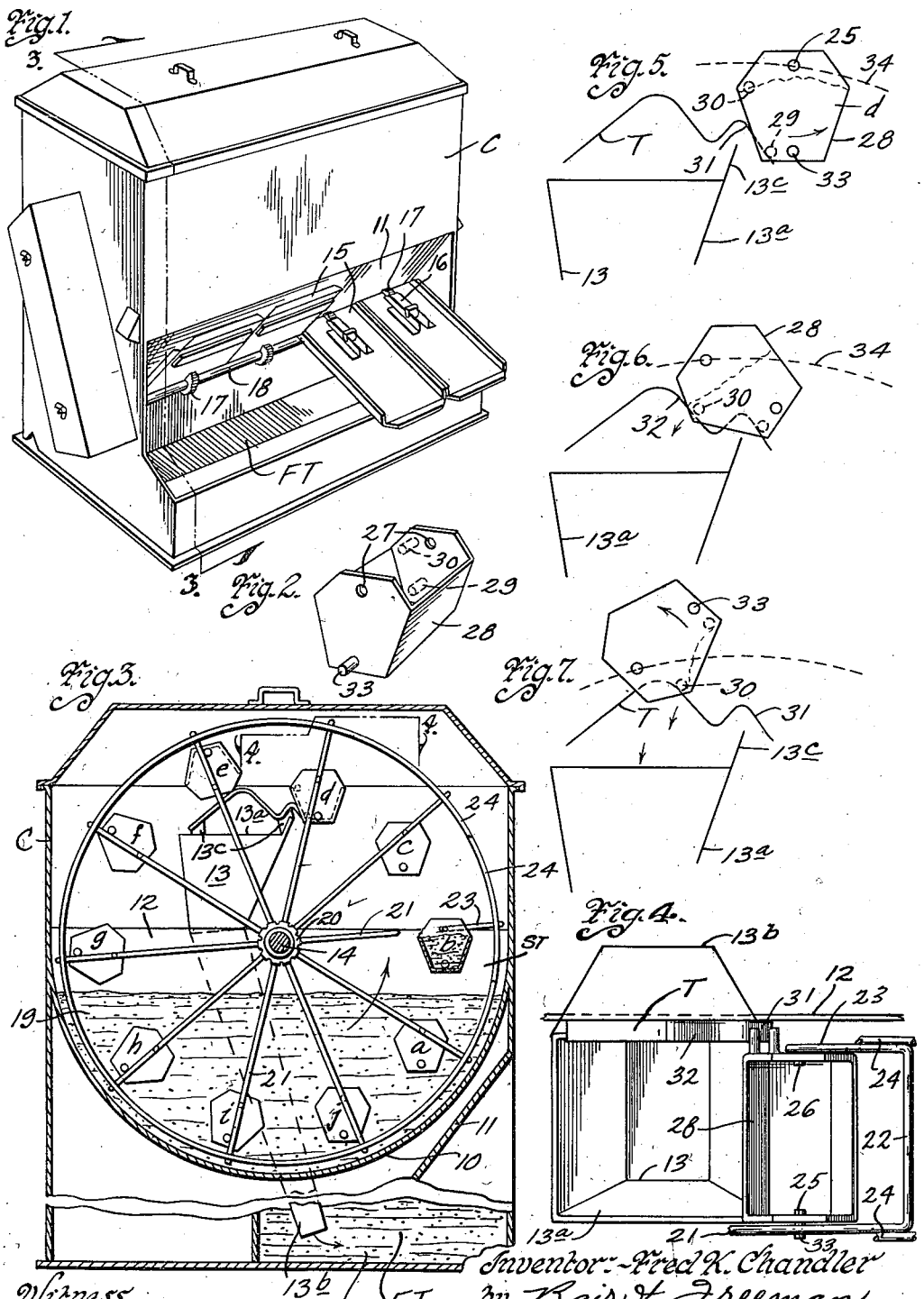

Patented Mar. 10, 1942

2,275,887

UNITED STATES PATENT OFFICE 2,275,887

FEED HANDLING APPARATUS

Fred K. Chandler, Des Moines, Iowa

Application January 2, 1940, Serial No. 312,045

7 Claims. (Cl. 119—56)

My present invention relates to a feed handling apparatus particularly adapted for lifting a mixture of feed and water from a storage trough and depositing it in a feed trough.

One object of the invention is to provide a simple and inexpensive construction for accomplishing the above named purpose, such construction being an improvement over the type of apparatus shown in my co-pending application, Serial No. 222,454, filed August 1, 1938, now Patent No. 2,234,041, issued March 4, 1941.

Another object is to provide feed handling apparatus in the form of a rotary wheel with buckets pivoted thereto so that the buckets can become filled with the mixture of feed and water and will retain the mixture therein until it is lifted to a point where it can be quickly discharged into a chute and conducted through the chute to a feed trough, the operation of the device being an improvement over the device shown in my co-pending application because of retaining the water in the cups without letting some of it spill out and thereby cause a variation in the proportions of water and feed as experienced with the former type of apparatus.

Still a further object is to provide buckets that are pivoted to a wheel and a track coacting with projections from the bucket so as to effect a tipping and inverting of the bucket after which it is retained in inverted position until it dips into the mixture of feed and water thus effecting a ready refilling of the bucket with the mixture.

Although the invention is susceptible of a variety of embodiments, it is unnecessary to fully describe and illustrate more than one in order to give a full understanding of the invention both from its structural and functional standpoints. Accordingly, on the accompanying drawing I have illustrated a preferred and desirable embodiment of my feed handling apparatus. This drawing forms a part of this specification and throughout the views thereof like reference characters refer to the same parts. Referring now particularly to the drawing:

Figure 1 is perspective view of a feed handling apparatus embodying my present invention.

Figure 2 is a perspective view of a feed and water elevating cup used therein.

Figure 3 is an enlarged vertical sectional view on the line 3—3 of Figure 1.

Figure 4 is an enlarged plan view of one of the buckets and the chute with certain associated parts, some of which are in section on the line 4—4 of Figure 3; and Figures 5, 6 and 7 are diagrammatic views showing the tilting action of the buckets during operation of the rotary wheel supporting them.

On the accompanying drawing I have used the reference character C to indicate generally a casing. Within the casing C there is provided a storage trough ST and a feed trough FT. The feed trough is located below a semi-cylindrical wall 10 which forms a bottom for the storage trough ST.

At one end of the storage trough ST is a wall 12. Beyond the wall 12 a chute 13 is provided having an intake end 13a and a discharge end 13b. The discharge end, it will be noted, terminates in the feed trough FT. The chute 13 has its upper end 13a constituting its intake portion which conducts the material sidewise from within the wheel and over the upper edge of the wall 12 which is back of the wheel and in front of the portion of the chute 13 extending from the top of the wall 12 down to its discharge end 13b. A shaft 14 is rotatably supported relative to the casing C. The shaft 14 is adapted to be intermittently rotated by opening feed trough doors 15, the operative mechanism including pawls 16 and ratchet pinions 17. The pinions 17 are located on a shaft 18 which is operatively connected with the shaft 14 in a manner fully described in my co-pending application hereinbefore referred to, but this mechanism forms no part of my present invention. On the other hand, the present invention has to do with a means for lifting a mixture 19 of feed and water from the storage tank ST and depositing it in the chute 13 so that it will flow to the feed trough FT and which mechanism will now be described.

Secured to the shaft 14 is a hub 20 from which radiates a plurality of spokes 21. The spokes 21 have portions 22 and 23 which are supported by rims 24. The parts 21, 22, 23 and 24 may be made of rod material welded or otherwise suitably secured together.

The spokes 21 and the spoke extensions 23 are provided with studs 25 and 26 (see Figure 4) extending toward each other. The studs 25 and 26 pass through perforations 27 in the ends of cup members 28 whereby the cup members are pivotally mounted with respect to the wheel.

Each cup 28 has a pair of projections 29 and 30. These projections are adapted to coact with a track T for the purpose of tilting and inverting the cups 28 as will hereinafter be described. The track T is provided with a pair of cam portions 31 and 32 which enter into this operation and may be supported in a stationary position as by brackets 13c.

The cup members 28 are also provided with projections 33. These are adapted to at times engage the spokes 21 during the rotation of the wheel.

*Practical operation*

In the operation of my apparatus as the shaft 14 is rotated, the buckets 28 will dip into the mixture of feed and water at 19 and each lift a quantity thereof to a position of discharge into the chute 13. In Figure 3 the buckets 28 have been lettered *a* to *j*. The buckets *a*, *b* and *c* have been filled with the mixture 19 and are being elevated as the wheel rotates counter-clockwise. It will be noted that the projections 33 are free of the spokes 21 and therefore the buckets are free to remain in an upright position as the wheel rotates.

When a bucket reaches the position *d* (also shown in Figure 5), the bucket will be initially tilted by engagement of the projection 29 with the cam 31 of the track T. Further counter-clockwise rotation of the wheel (the path of movement of its pivots 25 and 26 being indicated at 34) will result in tilting of the bucket to the position of Figure 6 until finally the projection 30 engages the cam surface 32. Thereafter further rotation of the wheel will quickly tilt the bucket to an inverted position as shown in Figure 7 and finally to its maximum inverted position as shown at *e* in Figure 3. Thereafter the position of *f*, *g*, *h* and *i* will be successively assumed, while the projections 33 are stopped against the spokes 21.

The position of *g* is assumed just prior to dipping of the bucket into the mixture 19. By the time the position at *h* is reached, the bucket has become filled and remains so through the positions *i* and *j* whereupon the described cycle of operation is repeated beginning with the position of *a*.

The pivoting of the buckets permits them to retain their charge of mixed feed and water without some of the water spilling over the edge and leaving the feed, thereby resulting in partially dehydrating the charge before it is discharged into the chute 13, as is the case with a solidly mounted bucket as shown in my co-pending application. My present arrangement therefore eliminates the possibility of uneven proportions of feed and water picked up and discharged by the buckets.

The track T is so designed that it initially tips the bucket to discharging position as shown in Figure 6 and finally inverts it for quickly discharging its contents and also swinging the bucket to a position where it clears a wall 13c of the chute 13.

I have found the present apparatus very effective from the standpoint of increased efficiency of operation.

I have illustrated and described my improvement in an embodiment which I have found very satisfactory, but I have not attempted to illustrate or describe certain adaptations or modifications which I contemplate, or the various constructional details with respect to the mechanism for rotating the shaft 14, as it is believed that the foregoing disclosure in conjunction with the disclosure in my co-pending application will enable those skilled in the art to which this invention appertains to embody or adapt my improvements as may be desired. It is my intention to cover by the claims appended hereto modified forms of structure and use of mechanical equivalents which can be reasonably included within their scope.

I claim as new and desire to secure by Letters Patent of the United States:

1. In a feed handling apparatus of the character described, a storage trough, a feed trough, and means for lifting a mixture of feed and water from said storage trough and depositing it in said feed trough comprising a rotatable bucket support adapted to revolve in a vertical plane with the lower portion thereof submerged in a mixture of feed and water in said storage trough, a plurality of buckets pivoted thereto, a chute having an intake end adjacent the upper part of said rotary bucket support and a discharge end terminating in said feed trough and means adjacent said intake end of said chute to swing said buckets on their pivotal connections to effect tilting thereof to a position for discharging their contents into said chute, said means comprising a track, and projections from points on said buckets spaced from their pivotal mountings and adapted to coact with said track, said track being shaped to quickly tip said buckets to an inverted discharge position with said buckets remaining inverted until they pass the horizontal plane of the axis of rotation of said bucket support.

2. In a feed handling apparatus, a storage trough, a feed trough and means for lifting a mixture of liquefied feed from said storage trough and depositing it in said feed trough comprising a rotatable bucket support having its lower portion submerged in the mixture in said storage trough, a plurality of buckets pivoted thereto, a chute having an intake end adjacent the upper part of said rotary bucket support and a discharge end terminating in said feed trough and means adjacent said intake end of said chute to swing said buckets on their pivotal connections to effect tilting thereof to a position for discharging their contents into said chute, said means comprising a track having a pair of cam surfaces, each of said buckets having a projection spaced from its pivot and a second projection spaced from its pivot and closer thereto than the first projection, one cam surface of said track engaging said first projection and the other cam surface subsequently engaging said second projection.

3. In a feed handling apparatus of the character described, a storage trough, a feed trough and means for lifting a mixture of feed and water from said storage trough and depositing it in said feed trough comprising a rotatable spoked bucket supporting wheel having a portion thereof submerged in a mixture of feed and water in said storage trough, the spokes of said wheel having axially extending portions at the periphery of the wheel terminating in portions returning toward the axis of the wheel, a plurality of buckets pivoted to said spokes and to said last portions, means adjacent the upper portion of the wheel to swing said buckets on their pivotal connections to a discharge position and means below the buckets at the top of the wheel for conducting the contents discharged therefrom to said feed trough.

4. Feed handling apparatus of the character described comprising a storage trough, a feeding trough and means for lifting a mixture of feed and water from said storage trough and depositing it in said feeding trough comprising a rotatable bucket support adapted to revolve in a vertical plane with the lower portion thereof submerged in a mixture of feed and water in said storage trough, said support having a wheel portion in one plane, a plurality of buckets mounted on said support and wholly at one side of said last plane, a chute having an intake end beneath the buckets at the upper part of said rotary bucket support and a discharge end terminating in said feed trough and means adjacent said intake end of said chute to tilt said buckets to a position for discharging their contents into said chute, said means comprising a track and projections from said buckets coacting therewith.

5. Feed handling apparatus comprising a storage trough, a feed trough and means for lifting a mixture of feed and water from said storage trough and depositing it in said feed trough comprising a rotatable wheel arranged with the lower portion thereof submerged below the level of a mixture of feed and water in said storage trough, a plurality of buckets pivoted to said wheel adjacent the periphery thereof, a pair of projections on each bucket, a track adapted to coact therewith, said track having a pair of cam surfaces to coact with said pair of projections, one cam surface coacting with one of said projections to effect initial tilting of said bucket and the other cam surface coacting with the other projection to effect relatively quick inverting of the bucket to discharge its contents, and a chute receiving the contents from said bucket and conducting them to said feed trough.

6. In a feed handling apparatus, a storage trough, a feed trough and means for lifting a feed mixture from said storage trough and depositing it in said feed trough comprising a rotatable element arranged with a lower portion thereof submerged below the level of a feed mixture in said storage trough, a plurality of buckets pivoted to said rotatable element adjacent the periphery thereof, a pair of projections on each bucket one farther than the other from the pivotal axis, a track adapted to coact with said projections, said track having cam surface means to coact with said one projection to effect initial tipping and with said other one to effect relatively quick inverting of the bucket to discharge its contents, and means receiving the contents and conducting them into said feed trough.

7. Feed handling apparatus comprising a storage trough, a feed trough and means for conveying a mixture of feed and water from said storage trough to said feed trough comprising a rotatable wheel arranged for the lower portion thereof to be submerged below the level of a mixture of feed and water in said storage trough, a plurality of buckets pivoted to said wheel adjacent the periphery thereof, coacting projections at different distances from the pivot and a track means adapted to coact with said projections to effect initial tilting and thereafter relatively quick inverting of the bucket by engagement of said track means with said projections successively to discharge its contents, and a chute receiving the contents and conducting them to said feed trough.

FRED K. CHANDLER.